United States Patent [19]

Seyerle

[11] Patent Number: 4,689,939
[45] Date of Patent: Sep. 1, 1987

[54] OPERATOR PRESENCE CONTROL FOR SELF-PROPELLED IMPLEMENTS

[75] Inventor: Carl E. Seyerle, Cordova, Tenn.

[73] Assignee: Outboard Marine Corporation, Waukegan, Ill.

[21] Appl. No.: 818,351

[22] Filed: Jan. 9, 1986

Related U.S. Application Data

[63] Continuation-in-part of Ser. No. 746,938, Jun. 20, 1985, abandoned, which is a continuation of Ser. No. 697,681, Feb. 1, 1985, abandoned, which is a continuation of Ser. No. 490,960, May 2, 1983, abandoned.

[51] Int. Cl.⁴ ..................... A01D 69/08; A01D 34/67
[52] U.S. Cl. ......................................... 56/11.1; 56/11.8
[58] Field of Search ..................... 56/11.3, 11.1, 11.8, 56/11.7

[56] References Cited

U.S. PATENT DOCUMENTS

| | | | |
|---|---|---|---|
| 974,308 | 11/1910 | Swift | 74/194 |
| 1,143,048 | 6/1915 | Hunt | 74/194 |
| 2,138,239 | 11/1938 | Irgens | 180/19 |
| 2,285,230 | 6/1942 | Robertson | 56/11.6 |
| 2,453,999 | 11/1948 | Melling | 180/19 |
| 2,468,839 | 5/1949 | Rodesci | 56/11.6 |
| 2,514,917 | 7/1950 | Walstrom | 56/11.4 |
| 2,564,586 | 8/1951 | Smith et al. | 56/14.7 |
| 2,585,315 | 2/1952 | Herman | 180/6.2 |
| 2,623,603 | 12/1952 | Cutlan et al. | 180/19 |
| 2,824,415 | 2/1958 | Frazier | 56/11.6 |
| 2,860,473 | 11/1958 | Wehner | 56/11.1 |
| 2,947,132 | 8/1960 | Shaw | 56/11.1 |
| 3,396,809 | 8/1968 | Kortum | 180/19 |
| 3,411,275 | 11/1968 | Mattson et al. | 56/11.8 |
| 3,580,351 | 5/1971 | Mollen | 180/53 |
| 3,613,814 | 10/1971 | Prien, Jr. | 180/19 |
| 3,678,770 | 7/1972 | Enters et al. | 74/197 |
| 3,823,791 | 7/1974 | Sheler | 180/6.66 |
| 4,058,957 | 11/1977 | Roseberry | 56/11.3 |
| 4,108,268 | 8/1978 | Block | 180/74 |
| 4,117,652 | 10/1978 | Jones | 56/11.8 |
| 4,122,652 | 10/1978 | Holtermann | 56/11.8 |
| 4,186,545 | 2/1980 | Hutchison | 56/11.3 |
| 4,212,141 | 7/1980 | Miyazawa et al. | 56/11.8 |
| 4,213,288 | 7/1980 | Takeuchi et al. | 56/11.6 |
| 4,214,641 | 7/1980 | Hauser | 56/11.8 |
| 4,265,133 | 5/1981 | Van Der Meulen et al. | 74/194 |
| 4,277,936 | 7/1981 | Hoft | 56/11.7 |
| 4,404,864 | 9/1983 | Parikh | 74/197 |
| 4,493,180 | 1/1985 | Wick | 56/11.3 |

Primary Examiner—Paul J. Hirsch
Attorney, Agent, or Firm—Michael, Best & Freidrich

[57] ABSTRACT

A self-propelled implement such as a lawn mower comprising a frame having a rearward end, a drive wheel which supports the frame for movement over the ground, an engine supported by the frame, a handle connected to the frame and extending rearwardly therefrom, the handle including a rearmost portion adapted to be held by a mower operator, and a transmission operably connected between the engine and the drive wheel for effecting sustained rotation of the drive wheel at any speed within a speed range between zero and substantially above zero.

13 Claims, 10 Drawing Figures

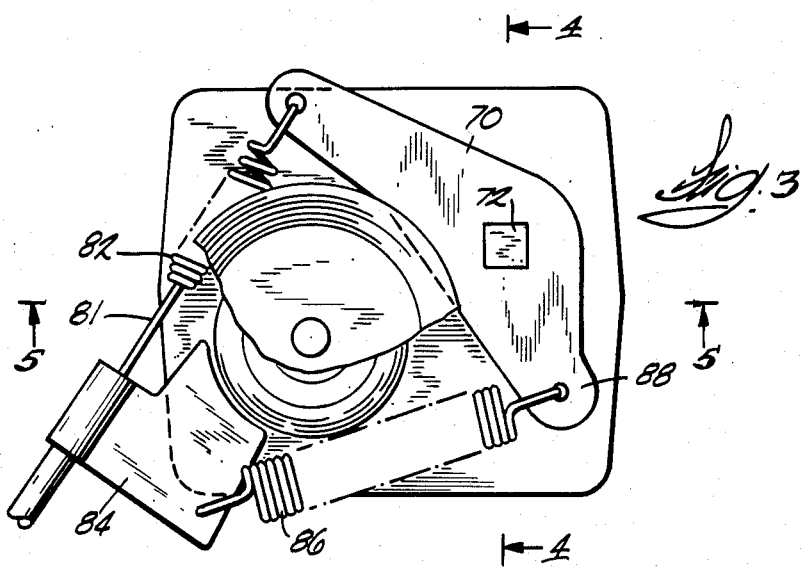
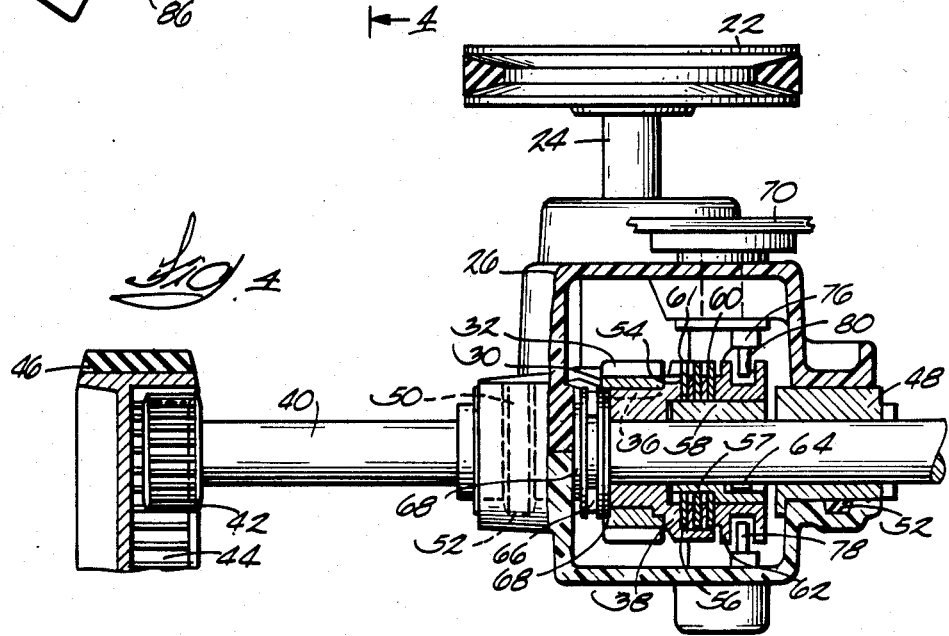
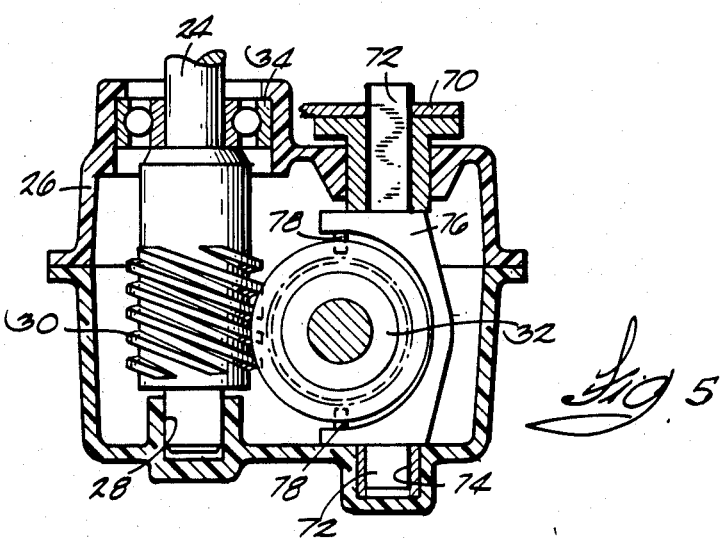

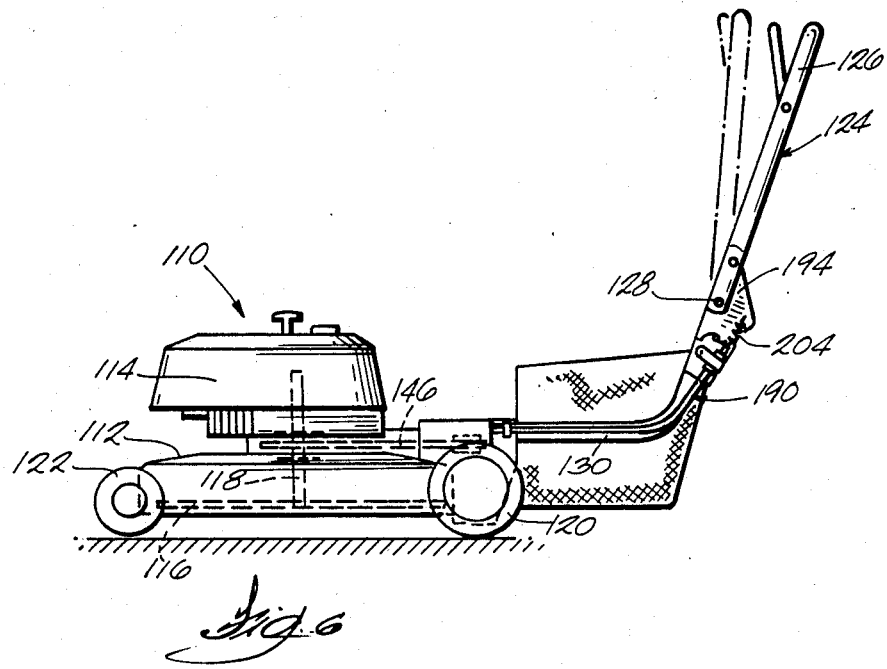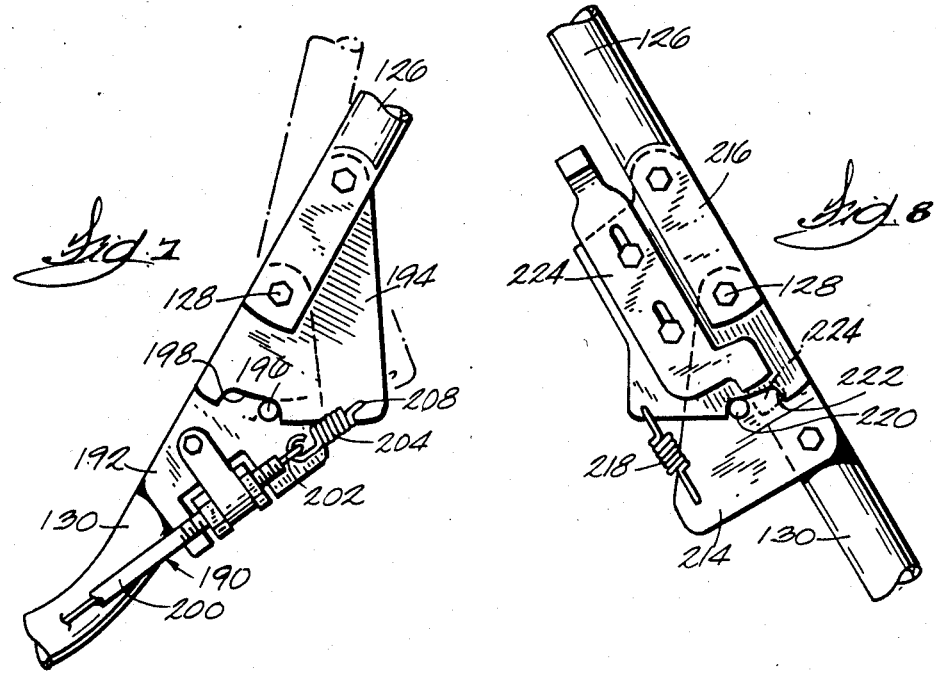

OPERATOR PRESENCE CONTROL FOR SELF-PROPELLED IMPLEMENTS

RELATED APPLICATION

This application is a continuation-in-part of Seyerle U.S. application Ser. No. 746,938, filed June 20, 1985 now abandoned, which is a continuation of Ser. No. 697,681, now abandoned, filed Feb. 1, 1985, which in turn is a continuation of Ser. No. 490,960 now abandoned, filed May 2, 1983.

BACKGROUND OF THE INVENTION

The invention relates to self-propelled implements, and, more particularly, to self-propelled lawn mowers. Still more particularly, the invention relates to operator actuated means for controlling the speed of self-propelled lawn mowers.

It is known in the art to provide self-propelled implements, and particularly self-propelled lawn mowers, which move forward when the operator handle is lifted or pushed forward. Examples of such implements are disclosed in some of the patents listed below.

Most known self-propelled lawn mowers operate at two speeds: zero speed and full speed. The operator is effectively unable to operate the lawn mower at intermediate speeds. Also, such lawn mowers are typically rear wheel drive and therefore tend to "wheelstand" when the drive system is engaged. This is undesirable because it impairs control of the lawn mower and results in uneven mowing.

Wehner U.S. Pat. No. 2,860,473—discloses a lawn mower with a three-speed (zero, low and high speeds) transmission which operates in response to actuation of a shift lever mounted on the lawn mower handle.

Parikh U.S. Pat. No. 4,404,864 and the references cited therein disclose variable speed driving mechanisms including a driven wheel and a driving wheel, with the driving wheel being rotatable in a plane normal to the plane of the driven wheel, and with the speed of rotation of the driven wheel being variable by varying the distance between the driving wheel and the axis of rotation of the driven wheel.

Attention is directed to the following U.S. Pat. Nos.:

| | | |
|---|---|---|
| Shaw | 2,947,132 | |
| Jones | 4,117,652 | Oct. 3, 1978 |
| Wehner | 2,860,473 | Nov. 18, 1958 |
| Irgens | 2,138,239 | Nov. 29, 1938 |
| Roberton | 2,285,230 | June 2, 1942 |
| Rodesci | 2,468,839 | May 3, 1949 |
| Melling | 2,453,999 | Nov. 16, 1948 |
| Walstrom | 2,514,917 | July 11, 1950 |
| Smith, et al. | 2,564,586 | Aug. 14, 1951 |
| Herman | 2,585,315 | Feb. 12, 1952 |
| Cutlan, et al. | 2,623,603 | Dec. 30, 1952 |
| Frazier | 2,824,415 | Feb. 25, 1958 |
| Kortum | 3,396,809 | Aug. 13, 1968 |
| Prien, Jr. | 3,613,814 | Oct. 19, 1971 |
| Sheler | 3,823,791 | July 16, 1974 |
| Block | 4,108,268 | Aug. 22, 1978 |
| Miyazawa, et al. | 4,212,141 | July 15, 1980 |
| Takeuchi, et al. | 4,213,288 | July 22, 1980 |
| Wick | 4,493,180 | Jan. 15, 1985 |
| Parikh | 4,404,864 | Sept. 20, 1984 |
| Van Der Meulen | 4,265,133 | May 5, 1981 |
| Enters | 3,678,770 | July 25, 1972 |
| Mollen | 3,580,351 | May 25, 1971 |
| Hunt | 1,143,048 | June, 1915 |

-continued

| | | |
|---|---|---|
| Swift | 974,308 | Nov. 1, 1910 |

SUMMARY OF THE INVENTION

The invention provides a self-propelled lawn mower having a frame provided with a drive wheel and supporting an engine, a drive train for delivering power from the engine to the drive wheel and including clutch means comprising multiple drive and driven plates which are separated when the clutch means is disengaged, means biasing the plates to separated positions, and manual control means actuated by an operator for variably applying axial load to the plates against the action of the biasing means so as to variably engage the clutch means to effect rotation of the drive wheel at selective speeds within a speed range between zero and substantially above zero.

The invention also provides a self-propelled lawn mower having a frame provided with a drive wheel and supporting an engine, a drive train for delivering power from the engine to the drive wheel and including clutch means for varying the rate of rotation of the drive wheel and including multiple drive and driven plates which are separated when the clutch means is disengaged, means biasing the plates to separated positions, and manual control means actuated by an operator for variably applying an axial load to the plates against the action of the biasing means so as to variably engage the clutch means to effect continuously variable operator controlled rotation of the drive wheel within a speed range from zero to substantially above zero.

The invention also provides a self-propelled lawn mower having a frame provided with a drive wheel and supporting an engine, a drive train for delivering power from the engine to the drive wheel and including a worm gear driven by the engine, a worm wheel driven by the worm gear, and clutch means for selectively varying the amount of power delivered from the engine to the drive wheel and including multiple drive plates driven by the worm gear and multiple driven plates which are operably connected to the drive wheel and which are separated from the drive plates when the clutch means is disengaged, means biasing the plates to non-driving separated positions, and manual control means actuated by an operator for variably applying axial load to the plates against the action of the biasing means so as to variably engage the clutch means to cause continuously variable operator controlled rotation of the drive wheel within a speed range from zero to substantially above zero.

The invention also provides a self-propelled lawn mower comprising a frame having a rearward end, a drive wheel which supports the frame for movement over the ground, an engine supported by the frame, a handle connected to the frame and extending rearwardly therefrom, the handle including a rearmost portion adapted to be held by a mower operator for guiding the lawn mower, the rearmost portion being pivotable between a rearward position and a forward position, and multiple-speed means operably connected between the engine, the handle and the drive wheel for variably and controllably effecting sustained rotation of the drive wheel at more than two speeds within a speed range between zero and substantially above zero, the means operating in response to movement of the handle rearmost portion between the rearward position and the forward position.

In one embodiment, the engine operates at a relatively constant rpm.

In one embodiment, the multiple-speed means includes drive means connected between the engine, the handle and the drive wheel.

In one embodiment, the drive means includes an output element mounted on the frame and drivingly connected to the drive wheel, an input element mounted on the frame and driven by the engine, and means for variably loading the elements so as to force the input element into frictional driving engagement with the output element.

In one embodiment, the drive means further includes means biasing the elements away from each other.

In one embodiment, the loading means includes cable means operably connected between the handle rearmost portion and one of the elements.

In one embodiment, the cable means has an upper end connected to the handle rearmost portion such that the upper end is pulled away from the frame in response to pivotal movement of the handle rearmost portion toward the forward position, and the cable means also includes a lower end operably connected to the one of the elements.

In one embodiment, the loading means further includes a spring connected between the upper end of the cable means and the handle rearmost portion such that movement of the handle rearmost portion toward the forward position causes elongation of the spring, and means for connecting the lower end of the cable means to the one of the elements such that the force exerted by the spring on the upper end of the cable means is translated into a load biasing the elements into engagement.

In one embodiment, the loading means further includes an arm pivotally movable about a first axis and operably connected to one of the elements for moving the input element into and out of engagement with the output element in response to pivotal movement of the arm, the handle rearmost portion is pivotable about a pivot axis, the upper end of the cable means is connected to the handle rearmost portion at a first point spaced a first distance from the pivot axis, the lower end of the cable means is connected to the arm at a second point spaced a second distance from the first axis, and the first distance is substantially greater than the second distance.

In one embodiment, the handle includes a lower portion having a lower end connected to the frame, and an upper end, and the handle rearmost portion is pivotally mounted on the upper end of the handle lower portion.

In one embodiment, the handle lower portion extends vertically a lower distance, and the handle rearmost portion extends vertically an upper distance substantially greater than the lower distance.

In one embodiment, the lawn mower further comprises means for limiting pivotal movement of the handle rearmost portion between the rearward position and the forward position.

In one embodiment, the multiple-speed means increases the speed of rotation of the drive wheel in response to movement of the handle rearmost portion from the rearward position toward the forward position.

In one embodiment, in the rearward position, the handle rearmost portion extends rearwardly and upwardly from the frame at a first angle of substantially less than 45° from vertical.

In one embodiment, the first angle is approximately 20° from vertical.

In one embodiment, in the forward position, the handle rearmost portion extends rearwardly and upwardly from the frame at a second angle spaced approximately 15° from the first angle.

In one embodiment, the first angle is approximately 20° from vertical, and the second angle is approximately 5° from vertical.

In one embodiment, the lawn mower further comprises means for biasing the handle rearmost portion toward the rearward position.

The invention also provides a self-propelled implement comprising a frame having a rearward end, a drive wheel which supports the frame for movement over the ground, an engine supported by the frame, a handle connected to the frame and extending rearwardly therefrom, the handle being adapted to be held by a mower operator for guiding the implement, and transmission means operably connected between the engine and the drive wheel for variably and controllably effecting sustained rotation of the drive wheel at any speed within a speed range between zero and substantially above zero, the transmission means including an output element mounted on the frame and drivingly connected to the drive wheel, an input element mounted on the frame and driven by the engine, and means for variably loading the elements so as to force the input element into frictional driving engagement with the output element.

The invention also provides a self-propelled implement comprising a frame having a rearward end, a drive wheel which supports the frame for movement over the ground, an engine supported by the frame, a handle connected to the frame and extending rearwardly therefrom, the handle including a rearmost portion adapted to be held by a mower operator for guiding the implement, the handle rearmost portion being pivotable between a rearward position and a forward position, and drive means operably connected between the engine, the handle and the drive wheel for variably and controllably effecting sustained rotation of the drive wheel at any speed within a speed range between zero and substantially above zero, the drive means operating in response to movement of the handle rearmost portion between the rearward position and the forward position.

The invention also provides a self-propelled implement comprising a frame having a rearward end, a drive wheel which supports the frame for movement over the ground, an engine supported by the frame, a handle connected to the frame and extending rearwardly therefrom, the handle including a rearmost portion adapted to be held by a mower operator for guiding the implement, the handle rearmost portion being pivotable between a rearward position and a forward position, and drive means operably connected between the engine, the handle and the drive wheel for variably and controllably effecting sustained rotation of the drive wheel at any speed within a speed range between zero and substantially above zero, with the speed being determined by the location of the handle rearmost portion between the rearward position and the forward position.

The invention also provides a self-propelled implement comprising a frame having a rearward end, a drive wheel which supports the frame for movement over the ground, an engine supported by the frame, a handle connected to the frame and extending rearwardly therefrom, the handle including a rearmost portion adapted to be held by a mower operator for guiding the implement, the rearmost portion being pivotable between a rearward position and a forward position, and drive means operably connected between the engine, the handle and the drive wheel for variably effecting rotation of the drive wheel at selective speeds within a speed range between zero and substantially above zero, the drive means operating in response to movement of the handle rearmost portion between the rearward position and the forward position.

The invention also provides a self-propelled implement comprising a frame having a rearward end, a drive wheel which supports the frame for movement over the ground, an engine supported by the frame, a handle connected to the frame and extending rearwardly therefrom, the handle including a rearmost portion adapted to be held by a mower operator for guiding the implement, and transmission means operably connected between the engine and the drive wheel for variably and controllably applying a sustained power to the drive wheel at any power within a range between zero and substantially above zero, the transmission means including an output element mounted on the frame and drivingly connected to the drive wheel, an input element mounted on the frame and driven by the engine, and means for variably loading the elements so as to force the input element into frictional driving engagement with the output element.

A principal feature of the invention is the provision of a self-propelled lawn mower with a drive system which permits the operator to run the lawn mower at any desired speed within a speed range between zero and substantially above zero. Essentially, the lawn mower reacts to the presence of the lawn mower operator, i.e., the lawn mower moves forward, up to its maximum speed, at the speed at which the operator walks. Actually, the lawn mower is constantly pulling away from and then coming back to the operator, but the frequency and amplitude of this movement are such that the effect is smooth operation at the speed chosen by the operator. When the operator speeds up, the mower speeds up, and when the operator slows down, the mower slows down.

Another principal feature of the invention is the provision of a self-propelled lawn mower that does not appreciably wheelstand when the drive system is engaged. Even if the operator causes immediate full engagement of the drive system, the speed of the lawn mower increases gradually so that the lawn mower does not wheelstand.

Other principal features and advantages of the invention will become apparent to those skilled in the art upon review of the following detailed description, claims, and drawings.

DESCRIPTION OF THE DRAWINGS

FIG. 3 is a plan view of the clutch control.

FIG. 4 is a vertical section on line 4—4 in FIG. 3 and on line 4—4 in FIG. 10.

FIG. 5 is a vertical section on line 5—5 in FIG. 3 and on line 5—5 in FIG. 10.

FIG. 6 is a side elevational view of a lawn mower which includes a handle and a drive system and which is a second embodiment of the invention.

FIG. 7 is an enlarged, fragmentary view of the handle shown in FIG. 6.

FIG. 8 is an enlarged, fragmentary view of the opposite side of the handle shown in FIG. 6.

Figure 1:
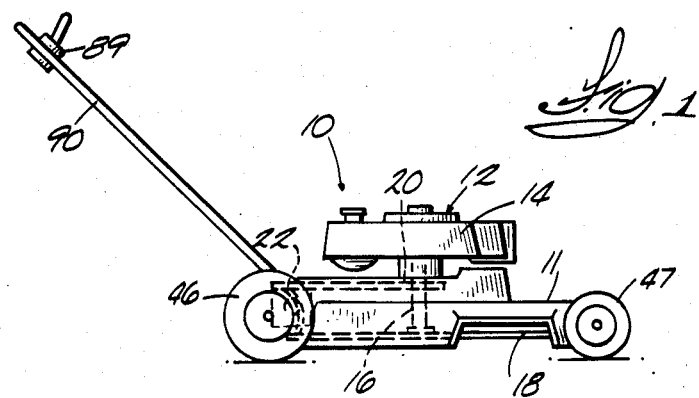
FIG. 1 is a side elevation showing the general orientation of the drive.
Figure 2:
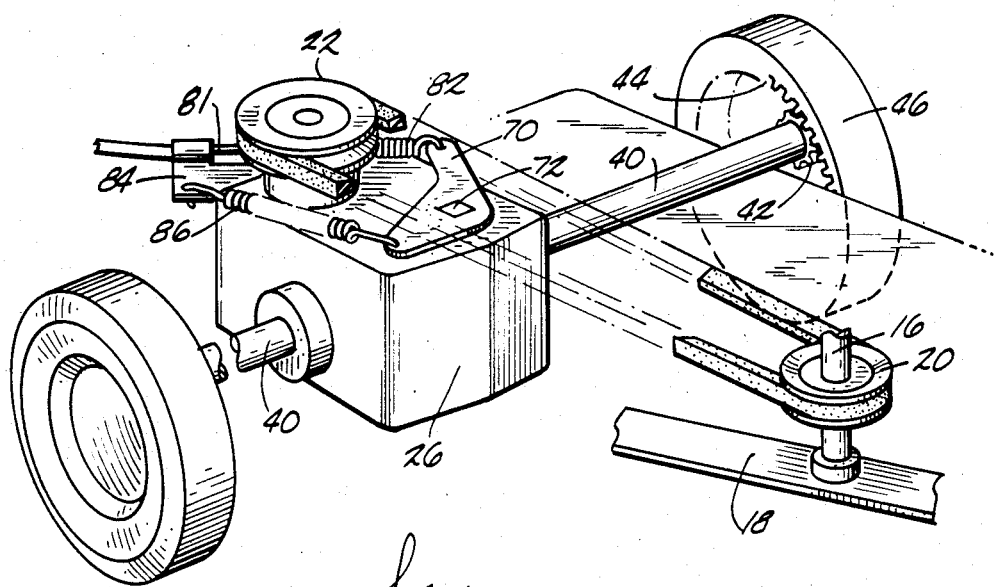
FIG. 2 is a fragmentary perspective view showing the drive train to the wheels.
Figure 10:
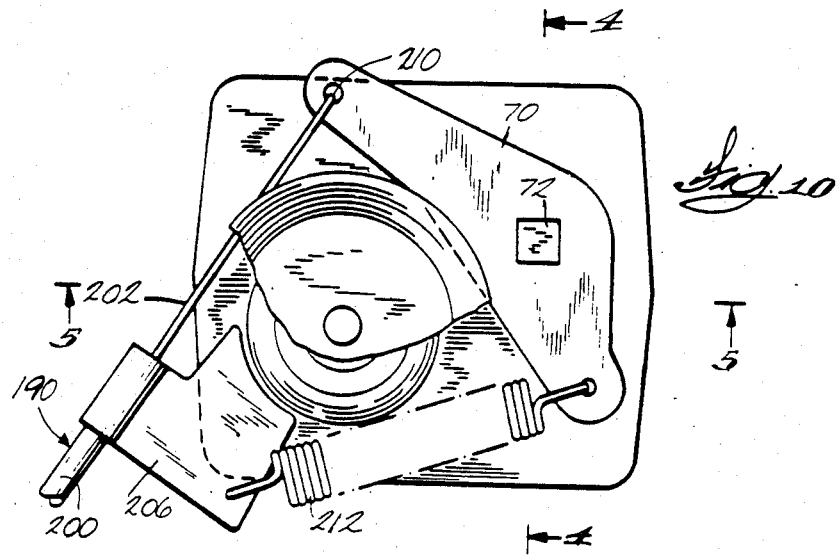
FIG. 10 is a partial, top view of the drive system shown in FIG. 9.

Before one embodiment of the invention is explained in detail, it is to be understood that the invention is not limited in its application to the details of construction and the arrangements of components set forth in the following description or illustrated in the drawings. The invention is capable of other embodiments and of being practiced or being carried out in various ways. Also, it is to be understood that the phraseology and terminology used herein is for the purpose of description and should not be regarded as limiting.

DESCRIPTION OF THE PREFERRED EMBODIMENTS

A first embodiment of the invention is illustrated in FIGS. 1-5.

The lawn mower 10 has a housing 11 supporting an engine 12 inside the cover 14. The engine drives shaft 16 on which the rotary mower blade 18 is mounted. The shaft 16 also carries a pulley 20 which drives a drive belt to pulley 22 mounted on input shaft 24 which projects upwardly from the transmission case 26. The lower end of shaft 24 is received in bearing 28 and the hardened steel worm gear 30 engages bronze worm wheel 32. The upper end of shaft 24 is journaled in bearing 34.

Worm wheel 32 is a spur gear keyed at 36 to drive member 38 which is journaled on the driven shaft 40 which extends transversely of the lawn mower and is provided, on each end, with a gear 42 which engages the internal ring gear 44 carried by each of the rear drive wheels 46 of the mower. The front of the mower housing is supported on front wheels 47. The drive shaft 40 is journaled in a bearing 48 at one end of the gear case 26 and in bearing 50 at the other end. Both bearings are provided with packing 52 to prevent loss of lubricant along the shaft. The worm wheel is selectively connected to the drive shaft 40 through a clutch.

The clutch includes the axially facing surface 54 of the drive member 38 which functions as a driver plate engageable with the adjacent driven plate 56. The clutch includes four additional driven plates 56. All the driven plates are shaped with a configuration such that the driven plates are, in effect, keyed at 57 to the driven sleeve 58. In a similar manner, all of the independent driver plates 60 are keyed at 61 to the driver member 38. When the clutch is disengaged, there is relative rotation between the driver plates and the driven plates. When the collar 62 is moved towards the worm wheel, it will squeeze the plates together so the driver plates engage the driven plates which in turn drive the sleeve 58 which drives the driven shaft 40 through the drive pin 64. A considerable axial load must be applied to the collar 62 to engage the clutch. The axial load is absorbed by the thrust bearing 66 mounted between the thrust washers 68, 68 on each side of the bearing, the thrust washer adjacent the inner wall of the casing being pushed into engagement with the inside axially facing surface of bearing 50.

The transmission housing is filled with lubricant. The driver plates and driven plates are hardened carbon steel plates and are not the kind of plates found in a dry clutch. When the clutch is disengaged, lubricant can get between the various plates. When the clutch is engaged, the axial loading first has to squeeze the lubricant out from between the plates in order for the plates to drive and the clutch to become fully operative. Therefore, this clutch with the proper number of plate sets and proper axial loading can be made to engage relatively slowly. This permits the speed of the mower to gradually increase. When the clutch is fully engaged, there is no slippage for all practical effects, but during the engagement there is slippage and the front wheels will not lift off the ground. The acceleration is smooth.

The clutch is actuated by means of the shift arm or yoke 70 mounted on and keyed to shaft 72 projecting from the top of the gear case parallel to the worm gear shaft. The lower end of the shaft 72 is journaled in a socket 74 molded into the lower part of the case 26. The shaft carries a shifting fork 76 having fingers 78 projecting inwardly to engage groove 80 in collar 62. One end of the yoke 70 has a Bowden wire (a push/pull cable) 81 connected thereto through spring 82. The Bowden wire 81 is anchored in bracket 84 mounted on the top of the transmission housing. A coil spring 86 connected between the bracket 84 and the other end 88 of yoke 70 biases the yoke to the position in which the clutch is disengaged. The Bowden wire is actuated by the manual control 89 carried on the handle 90 and having an over center action. The control goes over center and the clutch remains engaged until the manual control is actuated to disengage the clutch. As soon as the manual control is actuated back over center, the return spring 86 will ensure that the collar moves back from the stacked clutch plates and permits them to resume relative rotation between the plates.

The reduction in the belt drive from the engine shaft to the worm gear is 1.75:1. The reduction at the point of engagement of the drive gears with the internal gears of the drive wheels is 4:1. The worm gearset provides only a 4:1 reduction as opposed to the usual 7:1 reduction necessitated by the usual external gear at the wheel providing only 2:1 reduction.

Due to the 4:1 reduction at the wheels, the present clutch operates at higher speed that the prior design. This has advantages in that the torque handled by the clutch is much lower and the engagement is smoother (softer), both resulting in less shock to the transmission. Furthermore, the clutch has more positive lock-up when engaged (due to less torque) and slippage is decreased. The 4:1 reduction in the worm gearset reduces loading which reduces heat generation and reduces the operating temperature of the transmission. The temperature reduction is great enough to permit the transmission gear case to be molded out of plastic as opposed to the metal in the prior art. This is a direct cost reduction. The greatly reduced operating temperature results in a very substantial increase in life. The prior art arrangement generated such high temperatures that it caused considerable wear which in turn caused even higher temperatures and everything worked towards shortening the useful life of the transmission.

The greatly improved performance of the gearset by reason of reducing the gear ratio permits a very substantial increase in life as noted above. The present clutch arrangement contributes to the increased life with its inherent slippage on engagement. This avoids the high shock loads found in the art. Therefore, the engagement is easy and avoids the high loads in prior designs.

This invention has application to reel-type mowers as well. These mowers tend to tilt back on their rollers when the clutch engages. The present arrangement should avoid that and allow the mower to accelerate to speed smoothly.

A self-propelled, walk-behind implement which is a second embodiment of the invention is illustrated in FIGS. 6–10. While the implement could be a snowblower, a roto-tiller, a cultivator, etc., in the second embodiment, the implement is a lawn mower 110.

As best shown in FIG. 6, the lawn mower 110 comprises a frame or housing 112 having forward and rearward (or left and right) ends, an engine 114 supported by the frame 112, and a rotary cutting blade 116 driven by the engine 114 via a drive shaft 118. The lawn mower 110 also comprises a pair of rear drive wheels 120 which support the frame 112 for movement over the ground, and a pair of front wheels 122 (only one is shown) which also support the frame 112 for movement over the ground.

The lawn mower 110 further comprises a handle 124 connected to the rearward end of the frame 112 and including a rearmost portion 126 adapted to be held by a mower operator for guiding the lawn mower 110. The rearmost portion 126 is pivotable about a generally horizontal pivot axis 128 between a rearward position (solid lines) and a forward position (dotted lines). While in alternative embodiments the entire handle 124 can be pivotally connected to the frame 112, in the illustrated embodiment, the handle 124 includes a lower portion 130 having an upper end, and a lower end connected to the rearward end of the frame 112. Preferably, the position of the lower portion 130 relative to the frame 112 is adjustable, but the lower portion 130 is fixed relative to the frame 112 during operation of the lawn mower 110. The handle rearmost portion 126 is pivotally mounted on the upper end of the handle lower portion 130 for rotation relative thereto about the axis 128.

In the second embodiment, the handle lower portion 130 extends vertically a lower distance, and the handle rearmost portion 126 extends vertically an upper distance substantially greater than the lower distance. The significance of this is explained hereinafter.

Furthermore, in the second embodiment, in the rearward position, the handle rearmost portion 126 extends rearwardly and upwardly from the frame 112 at a first angle of substantially less than 45° from vertical. Preferably, the first angle is approximately 20° from vertical, or 70° from horizontal. In the forward position, the handle rearmost portion 126 extends rearwardly and upwardly from the frame 112 at a second angle spaced approximately 15° from the first angle so that, in the illustrated construction, the second angle is approximately 5° from vertical. The significance of these angles is also explained hereinafter.

The lawn mower 110 also comprises transmission means operably connected between the engine 114 and at least one of the drive wheels 120 for variably and controllably effecting sustained rotation of the drive wheels 120 at any speed within a speed range between zero and full speed (substantially above zero), or for applying a sustained power to the drive wheels 120 at any power within a range between zero and substantially above zero.

The lawn mower 110 also comprises means (hereinafter "multiple-speed means") operably connected between the engine 114, the handle 124 and at least one of the drive wheels 120 for variably and controllably effecting sustained rotation of the drive wheels 120 at more than two speeds within a speed range between zero and substantially above zero (i.e., at more than zero speed and full speed), the multiple-speed means operating in response to movement of the handle rearmost portion 126 between the rearward position and the forward position.

While various suitable multiple-speed means can be employed, including various suitable transmission means, in the second embodiment, both of these means include the same drive means or system. While various suitable drive means can be employed, in the second embodiment, the drive means is operably connected between the engine 114, the handle 124 and the drive wheels 120 for variably and controllably effecting sustained rotation of the drive wheels 120 at any speed within a speed range between zero and substantially above zero, the drive means operating in response to movement of the handle rearmost portion 126 between the rearward position and the forward position. Preferably, the drive means increases the speed of rotation of the drive wheels 120 in response to movement of the handle rearmost portion 126 from the rearward position toward the forward position (counter-clockwise in FIG. 6).

Alternatively stated, the drive means is operably connected between the engine 114, the handle 124 and the drive wheels 120 with the speed of rotation of the drive wheels 120 being determined by the location of the handle rearmost portion 126 between the rearward position and the forward position.

Further alternatively stated, the drive means is operably connected between the engine 114, the handle 124 and the drive wheels 120 for variably effecting rotation of the drive wheels 120 at selective speeds within a speed range between zero and substantially above zero, the drive means operating in response to movement of the handle rearmost portion 126 between the rearward position and the forward position.

Still further alternatively stated, the drive means is operably connected between the engine 114, the handle 124 and the drive wheels 120 for variably and controllably applying a sustained power to the drive wheels 120 at any power within a range between zero and substantially above zero, the drive means operating in response to movement of the handle rearmost portion 126 between the rearward position and the forward position.

It should be understood that in alternative embodiments of the invention, the multiple-speed means can include means including the pivotably mounted, guiding handle rearmost portion 126 for adjusting the throttle setting of the engine 114, rather than means for varying the transmission of power from the engine 114 to the drive wheels 120. However, in the illustrated embodiment, the engine 114 operates at a relatively constant rpm. Furthermore, in the second embodiment, the engine 114 has a power output capacity substantially greater than the power output capacity of the drive means, so that the engine rpm does not slow appreciably even under a full load.

In the second embodiment, the drive system or means includes a clutch including an input element mounted on the frame 112 and driven by the engine 114, and an output element mounted on the frame 112 and drivingly connected to the drive wheels 120. Preferably, this clutch is similar to the clutch of the first embodiment and is shown in FIGS. 4, 5, 9 and 10. Elements in FIGS. 9 and 10 that correspond to elements of the first embodiment have the same reference numerals. It should be understood that other types of clutches can be employed.

Figure 9:
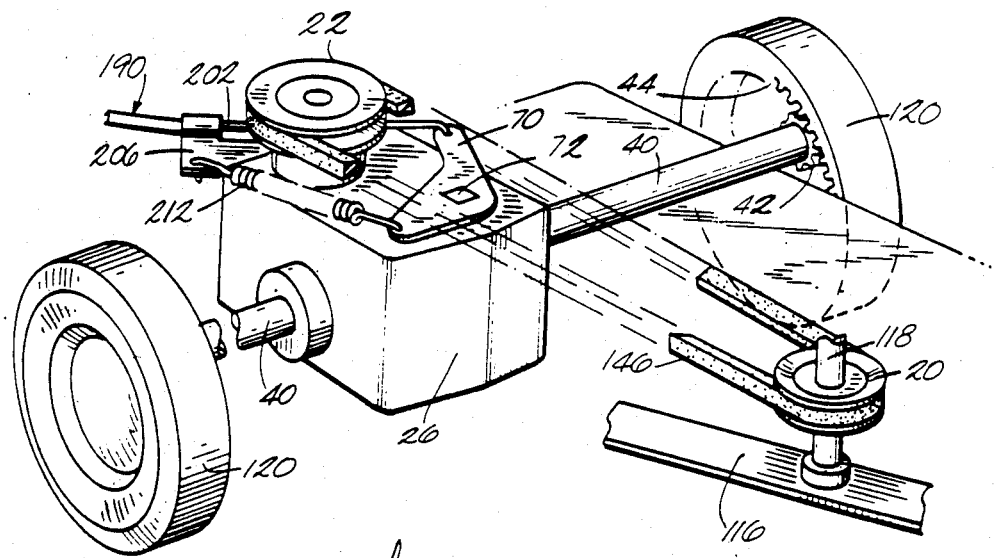
FIG. 9 is a fragmentary, perspective view of the drive system of the lawn mower shown in FIG. 6.

In the second embodiment, as best shown in FIG. 9, the pulley 20 is mounted on drive shaft 118 and is drivingly connected to pulley 22 by a belt 146.

The drive means also includes means for variably loading the input and output elements or plates 60 and 56 so as to force the input elements 60 into variable driving engagement with the output elements 56. While various suitable variable loading means can be used, in the second embodiment, such means includes the collar 62. As explained previously, axial movement of the collar 62 toward the worm wheel 32 axially loads the input and output plates 60 and 56 so as to force the input plates 60 into frictional driving engagement with the output plates 56.

The means for variably loading the input and output plates 60 and 56 also includes the shaft 72. Rotation of the shaft 72 in the counter-clockwise direction (as viewed in FIG. 10) causes axial movement of the collar 62 to the left (as viewed in FIG. 4), thereby axially loading the input and output plates 60 and 56.

The variable loading means also includes the shift arm or yoke 70 mounted on the upper end of the shaft 72 so that rotation of the arm 70 causes rotation of the shaft 72. Thus, counter-clockwise rotation of the arm 70 (as viewed in FIG. 10) axially loads the plates 60 and 56.

In the second embodiment, the variable loading means also includes cable means 190 operably connected between the handle rearmost portion 126 and one of the input and output elements or plates 60 and 56. In the illustrated embodiment, the lower end of the cable means 190 is connected to the input plates 60. While various suitable cable means 190 can be employed, in the second embodiment, the cable means 190 has an upper end connected to the handle rearmost portion 126 such that the upper end is pulled away from the lawn mower frame 112 in response to pivotal movement of the handle rearmost portion 126 toward the forward position, and the cable means 190 also has a lower end operably connected to the input elements 60.

In the illustrated construction, the upper end of the cable means 190 is connected to the right side of the handle rearmost portion 126. As best shown in FIG. 7, the handle 124 includes a left lower plate 192 fixedly mounted on the upper end of the handle lower portion 130, and a left upper plate 194 fixedly mounted on the lower end of the handle rearmost portion 126. Thus, the left upper plate 194 rotates with the handle rearmost portion 126 about the pivot axis 128 and relative to the left lower plate 192 and to the handle lower portion 130. Preferably, the left lower plate 192 includes an outwardly extending stop or projection 196, and the left upper plate 194 includes a recess 198 which receives the stop 196. Engagement of the left upper plate 194 with the stop 196 at the opposite ends of the recess 198 limits pivotal movement of the handle rearmost portion 126 relative to the handle lower portion 130 between the rearward and forward positions.

Preferably, the cable means 190 includes an outer sheath 200 and a cable core 202 slidably received in the sheath 200. The upper end of the cable sheath 200 is fixedly secured to the left lower plate 192, and the cable core 202 extends outwardly and upwardly therefrom and is connected to the left upper plate 194 by a spring 204 such that movement of the handle rearmost portion 126 toward the forward position causes elongation of the spring 204. The reason for the spring 204 is explained hereinafter.

The lower end of the cable sheath 200 is fixedly connected to a bracket 206 mounted on the transmission case 26, and the lower end of the cable core 202 extends outwardly therefrom and is connected to the left end (as viewed in FIG. 10) of the arm 70. Accordingly, when the upper end of the cable core 202 is pulled away from the frame 112 by forward movement of the handle rearmost portion 126, the lower end of the cable core 202 rotates the arm 70 in the counter-clockwise direction (as viewed in FIG. 10), thereby moving the input plates 60 toward the output plates 56.

In the second embodiment, the variable loading means further includes the spring 204 connected between the upper end of the cable core 202 and the handle rearmost portion 126, and means for connecting the lower end of the cable means 190 to one of the input and output elements 60 and 56 such that the force exerted by the spring 204 on the upper end of the cable means 190 is translated into a load biasing the input and output elements 60 and 56 into engagement. While various suitable means can be used for connecting the lower end of the cable means 190 to one of the input and output elements 60 and 56, in the illustrated construction, such means includes the arrangement described above (the arm 70, etc.).

Preferably, when the handle rearmost portion 126 is in the rearward position, the cable core 202 is slack, so that no force is exerted on the arm 70 by the lower end of the cable core 202. When the handle rearmost portion 126 is moved forwardly from the rearward position, the initial movement of the handle rearmost portion 126 takes up the slack in the cable core 202 and moves the cable core 202 far enough to cause engagement of the input and output elements 60 and 56. Further forward movement of the handle rearmost portion 126 causes elongation of the spring 204, so that the spring 204 exerts a force on the cable core 202, which force is transmitted to the arm 70 by the lower end of the cable core 202. Accordingly, the force exerted on the upper end of the cable core 202 by the spring 204 is translated into a load biasing the input and output elements 60 and 56 into engagement. The force exerted by the spring 204 increases as the spring 204 is elongated, so that the load on the input and output elements 60 and 56 increases as the handle rearmost portion 126 is moved from the rearward position toward the forward position.

As mentioned previously, the transmission case 26 is filled with lubricant. When the input and output plates 60 and 56 are disengaged, the lubricant flows between the plates. When the plates 60 and 56 are moved into engagement, most of the lubricant is squeezed out from between the plates. As the plates 60 and 56 are initially loaded by the spring 204, driving engagement with relative slippage of the plates occurs. At this point, there is still lubricant between the plates 60 and 56. As the load on the plates 60 and 56 increases, more lubricant is squeezed out from between the plates, and less relative slippage and more driving engagement occurs. If the handle rearmost portion 126 is maintained in a position intermediate the rearward and forward positions, a partial loading of the plates 60 and 56 will be maintained, and the plates 60 and 56 will remain in a state of relative slippage with partial driving engagement.

Unless the input and output plates 60 and 56 are in full driving engagement, so that there is no relative slippage of the plates, there will be some lubricant present between the plates. Accordingly, there is no metal-to-metal contact of the plates 60 and 56 except during full driving engagement when there is no relative slippage of the plates. This results in little or no wear of the input and output plates 60 and 56.

Because the spring 204 is located between the upper end of the cable means 190 and the handle rearmost portion 126, when the handle rearmost portion 126 is moved forwardly from the rearward position, the cable core 202 only has to move far enough to take up the slack in the cable core 202 and to cause engagement of the input and output elements 60 and 56. After this engagement, further forward movement of the handle rearmost portion 126 only causes elongation of the spring 204 and not movement of the cable core 202. Accordingly, the cable core 202 is substantially stationary relative to the outer sheath 200 at most times during operation of the lawn mower 110. This has at least two advantages. First, it reduces wear on the cable means 190. Second, the operator does not have to overcome the force of friction exerted by the outer sheath 200 on the cable core 202 while causing elongation of the spring 204 to load the input and output elements 60 and 56.

In the second embodiment, the upper end of the cable means 190 is connected to the handle rearmost portion 126 (specifically to the left upper plate 194) at a point 208 spaced a first distance below the pivot axis 128, the lower end of the cable means 190 is connected to the arm 70 at a second point 210 spaced a second distance from the axis of the shaft 72, and the first distance is substantially greater than the second distance. This provides a substantial mechanical advantage.

As mentioned previously, the vertical extent of the handle rearmost portion 126 is substantially greater than the vertical extent of the handle lower portion 130. This permits the distance between the upper end of the handle rearmost portion 126 and the pivot axis 128 to be substantially greater than the above-mentioned first distance between the cable means 190 and the pivot axis 128. Specifically, in the second embodiment, the upper end of the handle rearmost portion 126 is spaced a third distance from the pivot axis 128, and the ratio of the third distance to the first distance is approximately 10/1. This also provides a substantial mechanical advantage when the force exerted by the operator on the upper end of the handle rearmost portion 126 is transferred to the spring 204.

Furthermore, because the handle rearmost portion 126 extends rearwardly and upwardly from the frame 112 at an angle of substantially less than 45° from vertical, little of this mechanical advantage is lost if the operator pushes on the handle rearmost portion 126 in the straight forward direction rather than in a forward and upward direction perpendicular to the handle rearmost portion 126. If the operator pushes on the handle rearmost portion 126 in the straight forward direction, the mechanical advantage of the handle rearmost portion 126 is reduced to 10 times the cosine of the angle between the handle rearmost portion 126 and vertical. Thus, reducing the angle between the handle rearmost portion 126 and vertical increases the mechanical advantage. In other words, as the handle rearmost portion 126 moves toward the vertical position, the mechanical advantage increases. Because the handle never passes the vertical position (it is still 5° from vertical in the forward position), the mechanical advantage provided by the handle rearmost portion increases between the rearward position and the forward position. Therefore, the handle rearmost portion 126 provides the greatest mechanical advantage when it is most needed, i.e., when the force exerted on the spring 204 by the operator is the greatest.

In the second embodiment, the drive means further includes means biasing the input and output elements 60 and 56 away from each other. While various suitable means can be used, in the illustrated construction, the biasing means includes a spring 212 connected between the bracket 206 and the right end (as viewed in FIG. 10) of the arm 70. The spring 212 biases the arm 70 in the clockwise direction so as to bias the input plates 60, via the shaft 72, the shifting fork 76, and the collar 62, away from the output plates 56. While the lawn mower 110 will operate satisfactorily without this biasing means, the spring 212 helps reduce wear on the input and output plates 60 and 56 and helps return the cable core 202 to its original position.

The lawn mower 110 preferably further comprises means for biasing the handle rearmost portion 126 toward the rearward position. It should be noted that the spring 204, as well as the force of gravity, biases the handle rearmost portion 126 toward the rearward position. In the second embodiment, the lawn mower 110 comprises means in addition to the spring 204 and the force of gravity for biasing the handle rearmost portion 126 toward the rearward position. This biasing means determines the amount of force necessary to move the handle rearmost portion 126 forwardly and thus to make the lawn mower 110 move forwardly. Accordingly, variation of the force exerted by this biasing means varies the sensitivity of the lawn mower 110 to the operator. Furthermore, in the second embodiment, this biasing means is located on the right side of the handle 124 in order to offset the biasing action of the spring 204 and therefore to stabilize the handle rearmost portion 126. While various suitable biasing means can be used, in the illustrated construction, the right side of the handle 124 includes a right lower plate 214 and a right upper plate 216 similar to the left lower plate 192 and the left upper plate 194, respectively, and the biasing means includes a spring 218 connected between the right lower plate 214 and the right upper plate 216.

Furthermore, in the second embodiment, the right lower plate 214 includes a stop or projection 220 similar to the stop 196 on the left lower plate 192, and the right upper plate 216 includes a recess 222 similar to the recess 198 on the left upper plate 194. Additionally, the right upper plate 216 preferably has slidably mounted thereon a latch member 224 movable between an upper position (FIG. 8) wherein the latch member 224 permits movement of the stop 220 within the recess 222 (and therefore permits movement of the handle rearmost portion 126 relative to the handle lower portion 130), and a lower position (shown in dotted lines in FIG. 8) wherein the latch member 224 traps the stop 220 within the recess 222 to lock the handle rearmost portion 126 in the rearward position.

The lawn mower 110 preferably further comprises means for limiting pivotal movement of the handle rearmost portion 126 between the rearward position and the forward position. While various suitable limiting means can be employed, in the second embodiment, the limiting means includes the recesses 198 and 222 and the stops 196 and 220.

The lawn mower 110 preferably further comprises a deadman control or combined engine brake and ignition control as disclosed in Smith U.S. Pat. No. 4,419,857, which is incorporated herein by reference. As shown in FIG. 6, the deadman control includes a lever 226 mounted on the handle rearmost portion 126 above the upper plates 194 and 216. The lever 226 is movable between a first position (solid lines) wherein the lever 226 is spaced from the handle rearmost portion 126, and a second position (dotted lines) wherein the lever 226 is closely adjacent the handle rearmost portion 126. Furthermore, the lever 226 is biased to the first position.

When the lever 226 is in the first position, the deadman control prevents engine rotation and ignition. When the lever 226 is in the second position, the deadman control permits engine rotation and ignition. Accordingly, in order to operate the lawn mower 110, the operator must hold the lever 226 closely adjacent the handle rearmost portion 126, or must hold the lever 226 and the handle rearmost portion 126 together. This is a very simple action for the operator: it requires little more effort than holding only the handle rearmost portion 126.

The lawn mower 110 operates as follows: When the operator begins to walk forward behind the stationary lawn mower 110, the operator causes the handle rearmost portion 126 to move forwardly relative to the handle lower portion 130. As soon as the handle rearmost portion 126 has moved forwardly far enough to take up the slack in the cable 202, further forward movement of the handle rearmost portion 126 causes engagement of the input and output plates 60 and 56, thereby moving the mower 110 forward. As long as the operator is moving faster than the mower 110, the handle rearmost portion 126 will move forwardly relative to the handle lower portion 130, thereby causing the mower 110 to speed up. When the mower 110 reaches the speed of the operator, the handle rearmost portion 126 will be stationary relative to the handle lower portion 130, and the mower 110 will maintain a constant speed. Actually, the mower 110 will constantly pull away from and then come back to the operator, but the frequency and amplitude of this relative motion are such that the effect is smooth operation of the mower 110 at the speed chosen by the operator. Essentially, the lawn mower 110 reacts to the presence of the operator.

When the operator slows down, the handle rearmost portion 126 moves rearwardly relative to the handle lower portion 130 to slow down the mower 110.

If the operator initially moves forwardly so fast that the handle rearmost portion 126 is moved immediately to the forward position, the mower 110 will not "wheelstand" due to the above described gradual engagement of the drive system.

Various features and advantages of the invention are set forth in the following claims.

I claim:

1. A self-propelled lawn mower having a frame provided with a drive wheel and supporting an engine, a drive train for delivering power from the engine to the drive wheel and including clutch means comprising multiple drive and driven plates which are separated when the clutch means is disengaged, means biasing said plates to separated positions, and manual control means actuated by an operator for variably applying axial load to said plates against the action of said biasing means so as to variably engage said clutch means to effect rotation of said drive wheel at selective speeds within a speed range between zero and substantially above zero.

2. A lawn mower according to claim 1 in which said clutch is lubricated and the lubricant is expelled from between the plates as the clutch is engaged.

3. A self-propelled lawn mower having a frame provided with a drive wheel and supporting an engine, a drive train for delivering power from said engine to said drive wheel and including a worm gear driven by said engine, a worm wheel driven by the worm gear, and clutch means including multiple drive plates driven by said worm gear and multiple driven plates which are operably connected to said drive wheel and which are separated from said drive plates when said clutch means is disengaged, means biasing said plates to non-driving separated positions, and manual control means actuated by an operator for variably applying axial load to said plates against the action of said biasing means so as to continuously variably engage said clutch means to effect rotation of said drive wheel at selective speeds within a speed range between zero and substantially above zero.

4. A lawn mower according to claim 3 in which the driven plates of the clutch means are drivingly connected to a drive shaft, a drive gear on one end of said drive shaft, and a driven gear mounted on said wheel and driven by said drive gear.

5. A lawn mower according to claim 4 in which the driven gear is an internal ring gear.

6. A lawn mower according to claim 5 in which the speed reduction at the wheel is about 4:1.

7. A self-propelled rotary lawn mower having a housing having rear drive wheels and front support wheels, an engine mounted on the housing, a rotary cutter blade mounted inside the housing and driven by the engine, a transmission mounted on the housing and having an input shaft and an output shaft, a belt drive from the engine to said input shaft, said output shaft extending across the housing and having, on each end, a drive gear, each drive wheel having an internal ring gear engaged by one of said drive gears, said transmission including clutch means between the input and output shafts, said clutch means including multiple drive and driven plate sets immersed in lubricant, means biasing said plate sets into non-driving separated positions, and manual control means actuated by an operator for selectively applying axial load to said plates so as to move the plate sets into engagement against the action of said biasing means to cause lubricant to be expelled from between said plates and so as to effect continuously variable operator controlled rotation of said drive wheels within a speed range from zero to substantially above zero.

8. A lawn mower according to claim 7 in which there is a substantial speed reduction at the drive wheels.

9. A lawn mower according to claim 8 in which the transmission includes a speed reducing worm gearset.

10. A self-propelled lawn mower having a frame provided with a drive wheel and supporting an engine, a drive train for delivering power from said engine to said drive wheel and including clutch means for varying the rate of rotation of said drive wheel and including multiple drive and driven plates which are separated when said clutch means is disengaged, means biasing said plates to separated positions, and manual control means actuated by an operator for variably applying an axial load to said plates against the action of said biasing means so as to variably engage the clutch means to effect continuously variable operator controlled rotation of said drive wheel within a speed range from zero to substantially above zero.

11. A self-propelled lawn mower having a frame provided with a drive wheel and supporting an engine, a drive train for delivering power from said engine to said drive wheel and including a worm gear driven by said engine, a worm wheel driven by said worm gear, and clutch means for selectively varying the amount of power delivered from said engine to said drive wheel and including multiple drive plates driven by said worm gear and multiple driven plates which are operably connected to said drive wheel and which are separated from said drive plates when said clutch means is disengaged, means biasing said plates to non-driving separated positions, and manual control means actuated by an operator for variably applying axial load to said plates against the action of said biasing means so as to variably engage said clutch means to cause continuously variable operator controlled rotation of said drive wheel within a speed range from zero to substantially above zero.

12. A self-propelled rotary lawn mower including a housing having front support wheels and rear drive wheels each having an internal ring gear, an engine mounted on said housing, a rotary cutter blade mounted inside said housing and driven by said engine, and a drive train for delivering power from said engine to said drive wheels and including a drive belt driven by said engine, and a transmission mounted on said housing and having an input shaft driven by said drive belt, an output shaft extending across said housing and having, at each end, a drive gear engaged with one of said internal ring gears, and clutch means between said input and output shafts for selectively varying the power level transmitted from said engine to said rear drive wheels and including multiple drive plates on said input shaft, multiple driven plates on said output shaft and extending intermediate said drive plates, means biasing said plates into non-driving separated positions, and manual control means actuatable by an operator for variably applying axial load to said plates against the action of said biasing means so as to effect continuously variable operator controlled rotation of said drive wheels within a speed range from zero to substantially above zero.

13. A self-propelled rotary lawn mower including a housing having front support wheels and rear drive wheels each having an internal ring gear, an engine mounted on said housing, a rotary cutter blade mounted inside said housing and driven by said engine, and a drive train for delivering power from said engine to said drive wheels and including a drive belt driven by said engine, and a transmission mounted on said housing and having a worm driven by said drive belt, a worm wheel engaged by said worm, an output shaft extending across said housing and having, at each end, a drive gear engaged with one of said internal ring gears, and clutch means between said worm wheel and said output shaft for selectively varying the power level transmitted from said engine to said rear drive wheels and including multiple drive plates on said worm wheel, multiple driven plates on said output shaft and extending intermediate said drive plates, means biasing said plates into non-driving separated positions, and manual control means actuable by an operator for variably applying axial load on said plates against the action of said biasing means so as to effect continuously variable operator controlled rotation of said drive wheels within a speed range from zero to substantially above zero.

* * * * *